United States Patent [19]
Graziano et al.

[11] Patent Number: 5,532,937
[45] Date of Patent: Jul. 2, 1996

[54] SWITCHING OF MULTIPLE MULTIMEDIA DATA STREAMS

[75] Inventors: Michael J. Graziano, Warrenton; Jon F. Hauris; Daniel L. Stanley, both of Manassas, all of Va.

[73] Assignee: International Business Machines Corporation, Armonk, N.Y.

[21] Appl. No.: 189,533

[22] Filed: Jan. 31, 1994

[51] Int. Cl.⁶ .................................................. H04J 3/00
[52] U.S. Cl. .................................. 364/514 C; 340/825.06
[58] Field of Search .................... 364/514, 514 C; 340/825.03, 826, 825.06, 825.14, 80; 395/154, 200, 250, 550; 370/62, 68, 77

[56] References Cited

U.S. PATENT DOCUMENTS

| | | | |
|---|---|---|---|
| 3,641,273 | 2/1972 | Herold et al. | 370/80 |
| 4,528,660 | 7/1985 | Gentry | 370/80 |
| 5,325,310 | 6/1994 | Johnson et al. | 364/514 |
| 5,343,409 | 8/1994 | Satterfield et al. | 364/514 |
| 5,375,068 | 12/1994 | Palmer et al. | 364/514 |

*Primary Examiner*—Emanuel T. Voeltz
*Assistant Examiner*—Thomas Peeso
*Attorney, Agent, or Firm*—Joseph C. Redmond

[57] ABSTRACT

A method of switching multimedia data streams in response to requests to allocate or deallocate a user on a network receiving those data streams is herein described. The data streams are transmitted in master cycles, portions of each master cycle being allocated to each user. The relationship between the user and the portion of the master cycle is kept track of by means of a matrix method.

6 Claims, 3 Drawing Sheets

| Slot Number | 1 | 2 | 3 | 4 | 5 | 6 | 7 | 8 | 9 | 10 |
|---|---|---|---|---|---|---|---|---|---|---|
| Queue | 1 | 5 | 1 | 1 | 6 | 1 | 1 | 5 | 1 | 6 |

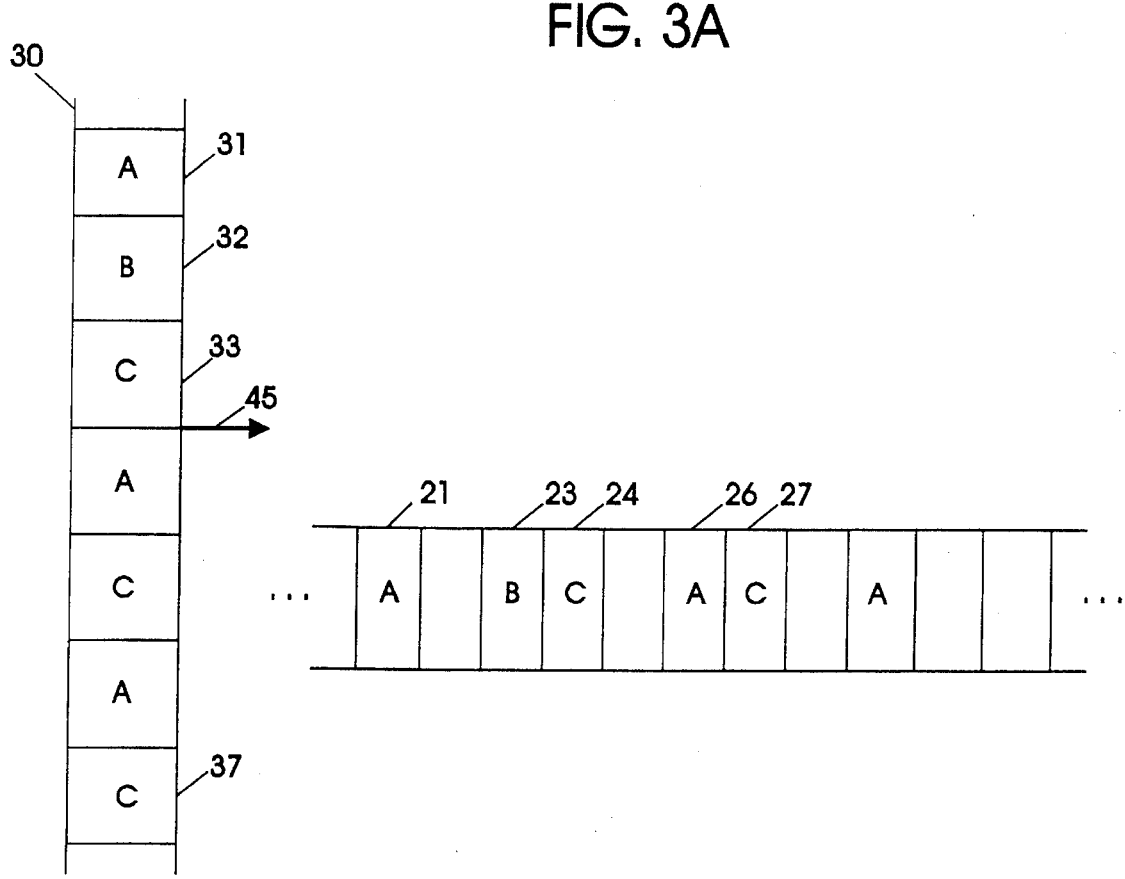
| Slot Number | 1 | 2 | 3 | 4 | 5 | 6 | 7 | 8 | 9 | 10 |
|---|---|---|---|---|---|---|---|---|---|---|
| Queue | 1 | 5 | 1 | 1 | 6 | 1 | 1 | 5 | 1 | 6 |

SWITCHING OF MULTIPLE MULTIMEDIA DATA STREAMS

FIELD OF INVENTION

This invention relates to the area of interactive multimedia presentation and communications systems in which multiple streams of multimedia data are transmitted to users, each user receiving a different stream. More particularly, this invention relates to a method and apparatus designed for use in multi-media applications which can respond to requests to change the data streams.

BACKGROUND OF THE INVENTION

The past decades have seen a continuous stream of new offerings to the public in the field of communication and entertainment. The development of the Video Cassette Recorder (VCR) has enabled consumers to go to video cassette outlets, rent tapes of movies. Once brought to the consumer's home, the consumer could play the movie at a time of its own choosing. Features of the VCR allowed the consumer to stop the movie at a specific point, rewind and replay all or part of the movie, and fast forward past sections of the movie that held little interest to the viewer.

At the same time, the availability of Cable TV allowed consumers access to a relatively wide selection of movies over a number of channels. The Cable TV system had the advantage that the consumer did not need to go to an outlet to obtain a tape. However, since Cable TV is a broadcast facility, the consumer only had access over his cable hookup to those movies being broadcast. That is, the movies from which he could select were dictated by the number of channels to which he had access and the particular selection of movies chosen by those channels. Further, he could only watch a specific movie at the time it was broadcast. That is, the time a movie could be viewed was dictated by the Cable TV channel schedule. In addition, the consumer was a passive participant, having no ability to stop, rewind or fast-forward the movie.

While these developments were occurring in the entertainment industry, equally revolutionary changes were occurring in the corporate sector. Business has long been familiar with the monomedia communications in which multiple users used servers to provide them functions. For example, a host or server computer which provides access to different applications to different users simultaneously can now be found in almost every enterprise. Similarly, a phone system which allows multiple users separate communications with other users is well known. As technology improved (and high speed networks that could handle 100MB/second transmissions developed), business began to experiment with multimedia communications which integrated different types of data. A generic example of such multimedia communications would be a video-conference between several people at different locations, where graphics or data was simultaneously displayed on terminals.

Most recently, the entertainment industry and the corporate sector has begun to merge the functions they provide to their users. Thus, development has begun on devices that could transmit individual streams of multimedia data to users under the users control. An example of this type of function would be a multimedia server which is capable of sending out multiple streams of data where each stream could be a training film, a movie for entertainment, images from a computer, teleconferences between users, screens from application programs, or other data.

Even in those cases where the multimedia streams consist primarily of fixed data (such as a movie transmission), there is a need to provide for some interaction with the user—to allow him, as he can do with his VCR, to stop the transmission, rewind and replay the transmission, or fast forward to another section. Thus, the multimedia servers envisions must not only have the capability of providing different data streams to different clients (or groups of clients), the network must be able to respond to requests for changes in the data streams. Of particular concern is the case in which a user leaves the network. One option would be to allow the channel allocated to the user to remain unused. This approach would be inefficient as well as requiring extremely wide bandwidth to be accessible in situations in which a number of users are attached to a single server.

OBJECTS OF THE INVENTION

It is accordingly an object of this invention to provide a method and apparatus that provide for efficient transmission of different multimedia data streams to different users.

It is a further object of this invention that the method and apparatus be able to respond to requests for changes in the transmission of these data streams where the request is that a user leave the network.

It is a further object of this invention that the method and apparatus be able to take a user out of the transmission stream without interrupting other clients.

It is a final object of this invention that the bandwidth or channel freed-up when a user is taken out of the transmission stream be available for use by other users.

SUMMARY OF THE INVENTION

The present invention overcomes the above described problems and deficiencies of the prior art and achieves technological advance by providing an improved method and apparatus by which different multimedia data streams may be transmitted to different users in such a way that the applications transmitted the data streams can respond to requests to change the data streams.

BRIEF DESCRIPTIONS OF THE DRAWINGS

FIG. 2B illustrates the associated switching matrix.

FIG. 3A illustrates the FRB queue and master cycle where lost synchronization has occurred once the second user B is taken out of the queue.

FIG. 3 illustrates the associated switching matrix.

DESCRIPTION OF CURRENT EMBODIMENT

The invention will be described in the context of a multimedia server which sends different movies (data streams) to different groups of clients (users). The video server will be assumed to be using a FDDI high speed network, although other high speed networks such as DQDB or B-ISDN could also be used.

Figure 1:
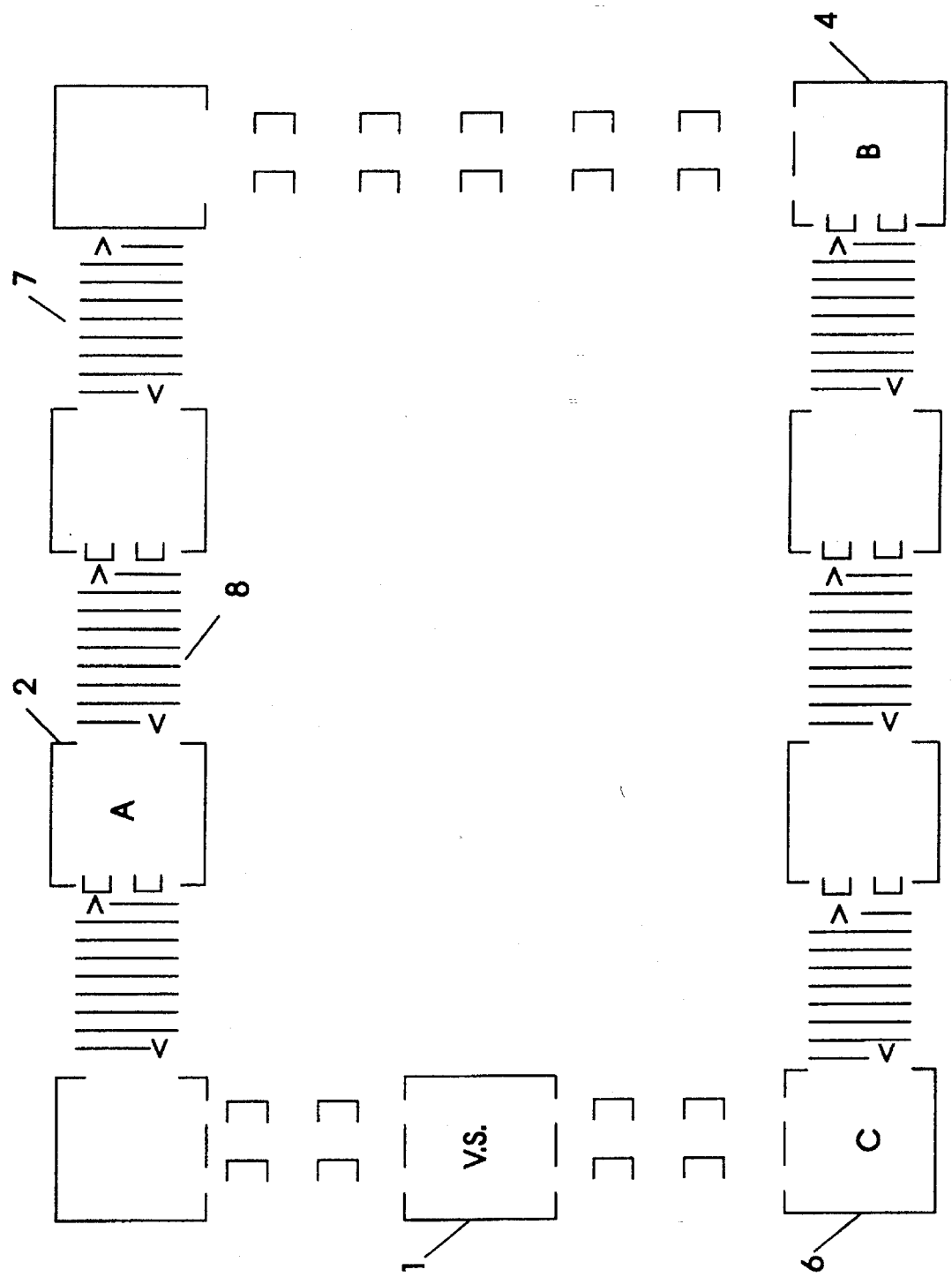
FIG. 1 is a schematic drawing of a video server transmitting to three clients.

FIG. 1 illustrates a typical video server (1) on a ring network (7) which is transmitting to three clients A(2), B(4), and C(6). In addition to the primary ring (7) on which the data streams will be transmitted, FIG. 1 illustrates a second, back-up ring (8) which is used in fault recovery. The back-up ring is useful but not required in implementing the invention.

Figures 2, 2A:
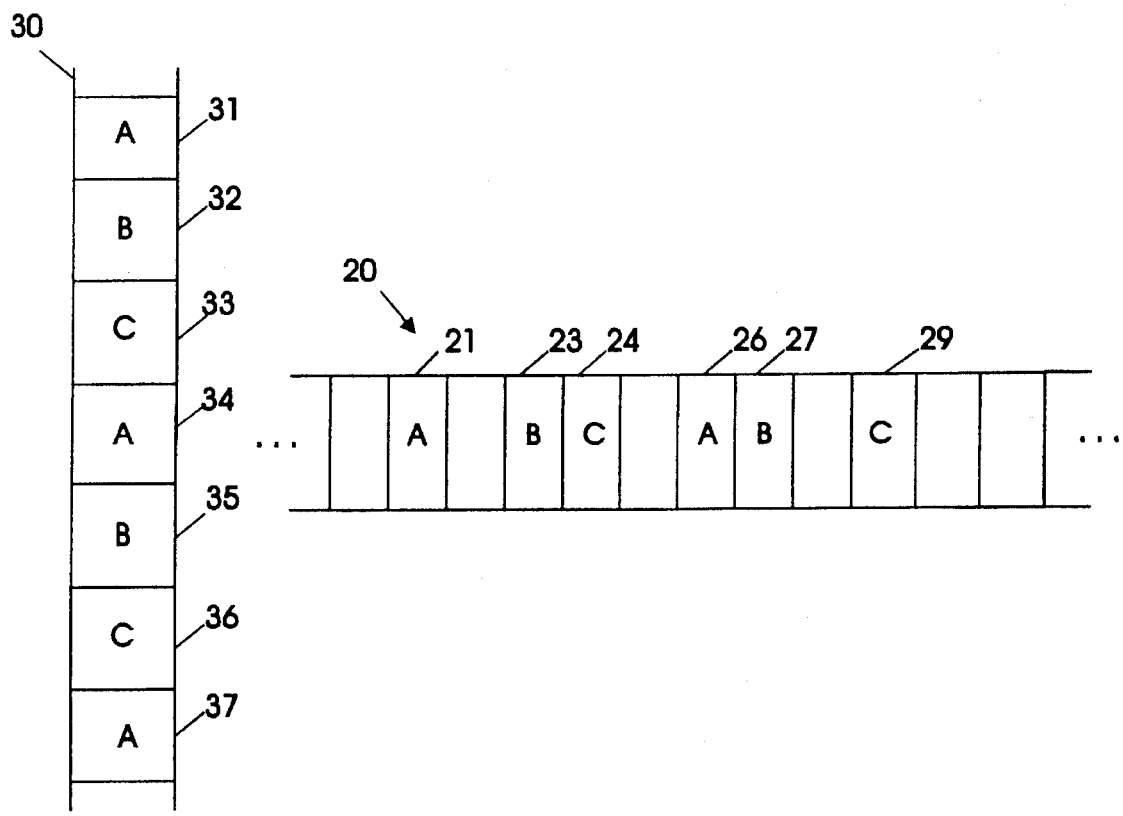
FIG. 2A illustrates the FRB Queue used to allocate channels between three servers and the master cycle over which the data is transmitted to the three clients.

The video server (1) is sending three separate movies, one to each of the three clients. The transmission is accomplished by sending information in standard time segments or master cycles. FIG. 2A illustrates one such master cycle (20). Each master cycle is initiated by a start signal and a series of control blocks. Following the start signal and control blocks (40), the master cycle is divided into equal length segments or time slots Each client is assigned some of these time slots for use in transmitting the clients data to that client.

The server stores the information to be transmitted to each client in a FDDI RAM buffer (FRB) queue (30) in a FDDI RAM Buffer in the server. More specifically, the buffer contains a First-In-First-Out queue, in which each member of the queue is a fixed amount of data destined for one of the servers. The members (or data groups) are placed in the queue in the order in which transmission will occur. (In our example, referring to FIG. 2A, the transmission sequence is A,B,C or the order in which the users are located on the transmission ring in FIG. 1). Thus, in FIG. 2A, the first element (31) of the queue (30) is A data, the second queue element (32) is B data, the third queue element (33) is C data, the fourth queue element (34) is A data, etc.

A switching matrix is created on the communication adapter. This matrix determines which of the time slots in the master cycle will be used for the transmission to the users assigned to the queue. The matrix is shown in FIG. 2B. As indicated in FIG. 2B, the master cycle is divided between queues 1 (shown in FIG. 2A, 30), 5 (not shown) and six (not shown). Referring to FIG. 2B, it can be seen that the first, third, fourth, sixth, seventh, and ninth time slots are assigned to the queue 1.

In operation, each data group (in this example, we will assume it is a single byte) is sequentially removed from the FIFO FRB queue and placed into the "next master cycle byte" that is allocated to that queue via the switching matrix. Accordingly, taking the information from the switching matrix of FIG. 2B and referring back to FIG. 2A, the first element (which is an A byte) (31) of the queue (30) is mapped to the first time slot (21) of the master cycle. The second element (which is a B byte) (32) of the queue (30) is mapped to the third time slot (23) of the master cycle. The third element of the queue (which is a C)(33) is mapped to the fourth element (24) of the master cycle, and so on until all time slots in the master cycle which were assigned to queue 1 are filled. It will be noted that the number of time slots in a master cycle assigned to a queue are a multiple of the number of distinct users assigned to the queue. Thus, in FIG. 2B it will be seen that six (3×2) time slots of the 10 available time slots are assigned to queue 1.

If the video server is instructed to "deallocate" the channel or circuit that a particular client is using, then the Switching Matrix change must be precisely correlated with the change in the FRB queue data pattern. If the correlation fails, then loss of synchronization can occur. This is best understood by referring to FIGS. 3A and 3B. In FIG. 3A, client B has been deallocated. Accordingly, at that point in time, the data for client B will no longer be put in the FRB Queue. Thus, data for B appears in the second queue element (32) (prior to deallocation), but does not appear in any other position in the queue. Thus, in FIG. 3A, the fourth queue element is A data, the fifth queue element is C data, the sixth queue element is A data, the second queue element is C data, etc. The boundary point 45 in FIG. 3A indicates the point at which B data was no longer placed in the queue. Consider the situation in which the Switching Matrix was not updated sufficiently quickly. In this case, assume the Switching Matrix stayed in the form given in FIG. 3B. Then, as can be seen from the master cycle mapping (20) in FIG. 3A, the first six master cycle slots are correctly filled, however, the seventh slot is filled with data from the fifth element of the queue. That is, C data is placed in the B slot. Similarly, the ninth slot (29) is filled with data from the sixth element of the queue: A data is placed in the C slot.

In the example described above, the FRB queue is updated before the Switching Matrix is updated. Similar problems occur if the order of update is reversed and if a channel is allocated (i.e. an additional user is "signed on") rather than deallocated.

In the first embodiment of the invention, the method and/or apparatus of the invention is used at the destination of a realtime peer-to-peer data transfer. That is, an external source of data (master source) transfers isochronous data to a receiver at a predefined, constant data rate, and the receiver is further distributes the data to the users.

In this environment, the synchronization of the switching matrix and the FRB queue is accomplished through the following steps.

Assume that client B is to be taken out of the channel stream:

1. The master source sends a control message (in the current embodiment, the control message is "Move Mode SCB") to the receiver. The control message contains information indicating that client B is to be deallocated. More precisely, client B wishes to be dropped from the network or, equivalently, no longer receive data. Accordingly, the portions of the master cycle previously allocated to B may be freed for use by other users.

2. After sending the control message, the master source begins placing "undefined" or "place-holder" data into the "B" slot. At this point in the process, the B user has been disconnected or deallocated and no longer requires active data, hence the B-data slots will go ignored.

3. Based on the control message, a new switching matrix is created in the receiver's memory.

4. When the matrix update is completed, the receiver sends a response message to the master source.

5. The master source stops transferring data over the channel at a master cycle boundary.

6. When the FRB queue empties, an interrupt occurs at the receiver to indicate an underflow condition (i.e. an empty queue).

7. After the interrupt, the receiver updates the switching matrix contained in the receiver by copying the newly created values from memory.

8. The receiver sends a second control message (in the current embodiment, the control message is "Move Mode SCB element") to the master source to indicate that the update has been completed.

9. The master source begins sending data in an order that reflects the deallocation of client B.

10. At the next master cycle boundary, the receiver begins placing data onto the ring network.

Note that the master source ultimately controls when the FRB queue goes empty, so that control at that source could ensure that the temporary interruption in data flow occurs at a boundary of the master cycle.

In a second embodiment, the invention is employed at the master station of a peer-to-peer data transfer network. That is, the data is from a master source to intermediate memory buffers to slave receivers.

Again, assume that client B is to be taken out of the channel stream:

1. The master source sends a control message (Move Mode SCB) to the receiver. The control message contains information indicating that client B is to be deallocated. In addition to indicating the availability of a new block of data within the mater cycle, the control message indicates that the block of data requires a new switching matrix. (In this embodiment, the matrix update data is send as part of the same control message.)

2. Based on the data in the control message, the receiver creates a new switching matrix in memory.

4. When the matrix update is completed, the receiver lets the FRB queue go empty.

5. After taking the interrupt, the receiver updates the switching matrix in by copying the newly computed values from memory.

6. The receiver provides the next update of transmitted information to the communication adaptor and then sends a response to the isochronous source.

7. At the next master cycle boundary, the receiver begins placing data in the stream using the new switching matrix?.

8. The transfer handshake continues as described in steps 7 and following of the previous example.

It will be noted that in the first embodiment, a potential problem of data latency is created. That is, The potential latency for the first embodiment can be estimated by the calculation:

IRQ response+matrix update+SCB transfer+SCB decode (at isochronous master source)+data transfer.

where, in the first embodiment:

| | |
|---|---|
| IRQ response | = time to receive underflow interrupt |
| | = 9 μs + interrupt execution = 20 μs (estimate) |
| Matrix update | = number of bytes × memory to memory transfer time |
| | = 600 ns (worst case estimate) |
| SCB transfer time | = micro channel latency + transfer time |
| | = micro channel latency (assuming a small SCB element, which is preformatted and ready to send) |
| SCB response decode at data source - can be optimized | |
| Data transfer | = approximated by dominating micro channel latency |

For a 20 byte matrix update, the calculation yields:

20 μs+12 μs+(2×worst case MC latency)+decode time

If the worst case latency is large, it could easily take several master cycles to update the map. A reasonable assumption in the case of the first embodiment would be two 125 μs master cycles worth of delay.

The latency in the second embodiment can be obtained from the calculation:

IRQ response+matrix update+data transfer

Where, in the second embodiment:

| | |
|---|---|
| IRQ response | = time to receive underflow interrupt |
| | = 9 μs + interrupt execution = 20 μs (estimate) |
| Matrix update | = number of bytes × memory to memory transfer time |
| | = 600 ns (worst case estimate) |
| data transfer | = micro channel latency + transfer time |
| | = micro channel latency (assuming the descriptor is small, preformatted and ready to send) |

For a 20 byte matrix update, the calculation yields:

20 μs+12 μs+worst case Master Cycle (MC) latency

Even if the worst case MC latency is large, it should be possible to update the map in one master cycle's worth of delay. Therefore, depending on how each update is aligned with master cycle boundaries, from one to three master cycles' worth of latency will be introduced for each update within a single queue. This latency will be cumulative. In environments in which frequent changes are envisioned, a periodic reset of the queue will be required.

It should also be noted that a possible problem of data integrity could occur when the switching matrix is updated. In each of the above scenarios, the FRB queue is forced to underflow to trigger the switching matrix update. During the several master cycles that it may take to respond to the underflow and update the map, "old" data will be left in the master cycles. Depending on the nature of the "old" data, this situation may lead to undesirable effects on the client stations, namely the corruption of non-audio video data (if it is sent via isochronous channels) or some digital noise in the audio-video signal.

To remedy this situation, an "idle" symbol pair is required. If a user definable control/control or control/data pair can be reserved for this purpose, then the communication adaptor can send an idle byte while the queue is in underflow and ignore the idle byte when it appears on the received data stream.

It is to be understood that the above embodiment is described in terms of deallocating a user. The same invention and techniques may be also used to allocate a channel for a new user.

It is to be understood that the above-described embodiments are merely illustrative of the principles of the invention. Various modifications and changes may be made thereto by those skilled in the art which will embody the principles of the invention and all within the spirit and scope thereof.

Accordingly,

We claim:

1. A method of switching multimedia data streams, said method comprised of:

a) sending of data by a master source to a receiver, said data transmitted in the form of master cycles, each of said master cycles being divided into uniform time slots, each slot containing client data to be transmitted to a specific client associated with said slot;

b) receiving of said data in a storage means contained in said receiver, said receiver distributing said client data in each of said slots to said associated client, said receiver having a switching matrix, said switching matrix comprised of an identifier for each slot and an identifier for each client, said matrix showing the correspondence between each of said slots and each of said clients, the slots related to the client data in the order of the client data stored in the storage means;

c) sending a control message from the master source, said first control message containing information indicating that a first client is to be deallocated;

d) placing "place-holder" data by the master source into those portions of the data stream allocated to said first client;

e) creating a new switching matrix said matrix comprised of said identifiers for each slot and a collection of said client identifiers, each client identifier correlated to a different client and to the order of the client data stored in the storage means, said collection not containing an identifier for said first client;

f) sending a response message by said receiver to said master source, said response message containing information indicating that said new switching matrix has been created;

g) ceasing to transfer data at a master cycle boundary by said master source;

h) sending to said receiver an interrupt message when said data has been emptied from the storage means;

i) using said new switching matrix in the receiver to control said sending of data by said receiver following receiving of said interrupt message;

j) sending by said receiver of a second control message indicating that said new switching matrix is being used;

k) sending data by said master source to said associated client in an order corresponding to said new switching matrix; and l) receiving said new data by said receiver and distributing said new data on said network according to said new switching matrix.

2. A system for switching multi-media data streams comprising:

a network including a server and at least one client station;

the server including a master cycle source initiated by a start signal and a series of control blocks, each master cycle being divided into uniform or equal length time slots following the start signal and the control blocks;

A storage means included in the server for storing client multi-media data in a queue on a FIFO basis, the order of such client data in the queue being related to the transmission length of the client station to the server;

a reconfigurable switching means included in the server for determining and assigning which time slot in the master cycle will be used for the transmission of client data in the storage means to the respective client stations on the network, the switching means coupling each time slot in the master cycle to the client data in the storage means using a unique identifier for each time slot in the master cycle and a different unique identifier for each client data in the storage means;

the switching means sequentially removing client data from the queue in the storage means on a FIFO basis for installation into the time slot of the master cycle coupled to the client data in the queue by using the unique identifier of the time slot in the master cycle and the coupled different unique identifier of the client data in the queue; and means for transmitting the time slotted client data on the network to the respective client stations.

3. The system of claim 2 further comprising:

means for instructing the server to "deallocate" a client station from the network;

means for placing a boundary point in the queue for the client data "deallocated" from the network;

means for reconfiguring the switching means with respect to the boundary point to prevent loss of synchronization of data to the other client stations on the network by such "deallocation".

4. The system of claim 3 wherein the synchronization of the switching means and the storage means comprises:

means for generating a first control message to the master cycle source, the message containing information indicating the client station to be "deallocated" from the network;

means for generating and installing "place-holders" into the master cycle time slots previously allocated to the "deallocated" client station;

means for reconfiguring the switching means in response to the first control message and transmitting a signal to the master cycle source to terminate the transfer of client data over the network at the boundary point.

5. The system of claim 4 further comprising:

means for emptying the storage means at the boundary point and sending a signal to the server to update the switching means with respect to client stations remaining on the network;

the reconfigured switching means coupling the time slots in the master cycle to the client data in the queue of the storage means; and means for sending a second control message to the master cycle source to transmit data on the network to the respective client stations, excluding the "deallocated" client station.

6. The system of claim 2 further comprising:

means for instructing the server to "allocate" a client station to the network;

means for placing a boundary point in the queue for the client data "allocated" to the network;

means for reconfiguring the switching means with respect to the boundary point to prevent loss of synchronization of data to the other client stations on the network by such "allocation".

\* \* \* \* \*